United States Patent [19]

Lendriet

[11] Patent Number: 5,098,034
[45] Date of Patent: Mar. 24, 1992

[54] VERTICAL/SHORT TAKEOFF OR LANDING AIRCRAFT HAVING A ROTATABLE WING AND TANDEM SUPPORTING SURFACES

[76] Inventor: William C. Lendriet, 8814 Sylmar Ave., Panorama City, Calif. 91402

[21] Appl. No.: 446,188

[22] Filed: Nov. 24, 1989

[51] Int. Cl.⁵ .............................................. B64C 27/00
[52] U.S. Cl. .................................. 244/39; 244/45 R; 244/217; 244/12.5; 244/60
[58] Field of Search ............ 244/39, 45 R, 45 A, 244/55, 213, 217, 54, 199

[56] References Cited

U.S. PATENT DOCUMENTS

| | | | |
|---|---|---|---|
| D. 203,283 | 12/1965 | Woods | 244/45 A |
| 1,890,059 | 12/1932 | Lake | 244/12.5 |
| 3,506,220 | 4/1970 | Sbrilli | 244/39 |
| 3,540,681 | 11/1970 | Orazi | 244/39 |
| 3,954,231 | 5/1976 | Fraser | 244/45 A |
| 3,995,794 | 12/1976 | Lanier | 244/60 |
| 4,238,094 | 12/1980 | McGann | 244/199 |
| 4,553,721 | 11/1985 | Jorgensen | 244/213 |
| 4,598,888 | 7/1986 | Béteille | 244/45 A |
| 4,605,185 | 8/1986 | Reyes | 244/60 |

FOREIGN PATENT DOCUMENTS

| | | | |
|---|---|---|---|
| 439990 | 3/1926 | Fed. Rep. of Germany | 244/45 A |
| 160359 | 1/1959 | Netherlands | 244/45 A |

Primary Examiner—Joseph F. Peters, Jr.
Assistant Examiner—Christopher P. Ellis
Attorney, Agent, or Firm—Albert O. Cota

[57] ABSTRACT

An improved vertical/short takeoff or landing aircraft (10). The aircraft has a canard wing (14), attached to the forward section of the aircraft body, that has an engine (26) on each side. Each engine drives a pusher propeller (42). Located aft of the canard wing (14) is a primary wing (16) that includes a number of control surfaces and that is rotatably attached to the fuselage (12). The primary wing (16) is rotated downwardly about its chord-wise axis when the aircraft takes off or lands vertically. When short takeoffs and landings are required the wing is partially rotated and during conventional flight, the wing is rotated to a position that is approximately parallel to the longitudinal axis of the aircraft (12). The aircraft also has a tail control group that consists of a horizontal stabilizer (22) and elevator (34) to where on each side is attached a vertical stabilizer (22) and rudder (36).

6 Claims, 4 Drawing Sheets

1

VERTICAL/SHORT TAKEOFF OR LANDING AIRCRAFT HAVING A ROTATABLE WING AND TANDEM SUPPORTING SURFACES

TECHNICAL FIELD

The invention pertains to the general field of vertical/short takeoff or landing aircraft and more particularly to such an aircraft that produces a locally generated and controlled airstream that is directed upon a wing which has a controlled angle of incidence in relation to the airstream. Thus, the wing provides sufficient lift to allow the aircraft to takeoff and land vertically or hover in flight.

BACKGROUND ART

The quest to build aircraft that can land straight down, lift straight up, hover in midair for a reasonable time, and then cruise off horizontally has continued for a number of years. The designs for this type of aircraft have included aircraft that employ engines attached to revolving main wings; air deflecting flexible curtains; wings with tunnels that contain wind directing airfoils and various other lifting airfoil configurations.

The majority of past and current vertical/short takeoff or landing (V/STOL) aircraft derive their vertical lift capability directly from the thrust provided by the propellers. Thus, the aircraft require engines with considerable power output and large diameter propellers. In some designs, the required propeller diameter is too large to allow the aircraft to make a conventional horizontal takeoff or landing, thereby restricting the aircraft to vertical takeoffs and landing.

In addition to the above problems, past aircraft have had their engines attached to the main wing. In some designs, the engines are solidly attached and revolve with the wing through a large angle of incidence when the wing rotates. In other designs, the engines are attached at the ends of the wings and rotate along with the propellers, thereby creating large inertial and gyroscopic forces. In some cases, this type of design requires an auxiliary propeller that is mounted in the tail of the fuselage normal to the longitudinal axis. The auxiliary propeller offsets the large pitching moments incurred as, for example, on the Canadian CL-84 V/STOL aircraft.

A search of the prior art did not disclose any patents that read directly on the claims of the instant invention however, the following U.S. patents were considered related:

| U.S. Pat. No. | INVENTOR | ISSUED |
| --- | --- | --- |
| 2,974,899 | Fowler | 14 March 1961 |
| 2,848,180 | Ploger | 19 August 1958 |
| 1,910,098 | Ellis | 23 May 1933 |
| 1,704,449 | Waldy | 5 March 1929 |

The Fowler patent discloses a single propeller aircraft designed for vertical take-off or landing and for conventional flight. The aircraft includes a fixed airfoil, a fixedly mounted engine, and a mechanically controlled, flexible curtain that deflects the slipstream of the propeller downwardly to produce an upward force to achieve vertical movement. Also, included are opposing wing tip jets and a high velocity gas ducting system. The jets produce lateral stability and control of the airplane during vertical takeoff and landing motions and aid in lateral stability of the aircraft in conventional flight and through the transition from vertical movements to conventional flight. The gas ducting system allows air to be conducted from a gas compressor and admixing it with the engine exhaust to produce a stream of high velocity gas that is ducted to the wing tip jets.

The Ploger patent discloses an airplane tunnel type wing for improving the operating characteristics of an aircraft. The wings have longitudinally extending tunnels mounted on each side of the aircraft body. Within the tunnels are placed airfoils designed to direct airflow so that the aircraft may be directed to rise substantially vertically or move in a horizontal direction. The airfoils can be adjusted by the pilot so that the lift and direction of lift is controlled and may also be oppositely adjusted to allow the aircraft to turn.

The Ellis patent discloses an aircraft that can takeoff or land with very little or no forward motion. The aircraft is designed with adjustable auxiliary lifting planes that are positioned within a confined passage located on each side of the aircraft within the airstream. The planes deflect the airstream downwardly, thereby causing a sufficient lifting moment that allows the aircraft to rise or land with little forward motion. The propellers are located to cause practically their entire airstream to flow into the confined passage in which are positioned the planes.

The Waldy patent discloses an aircraft that consists, in effect, of two triple planes arranged in tandem. The design includes pair of transversely arranged and longitudinally spaced fixed wings and a pair of superposed wings having vertically movable sections and located intermediate to the fixed wings. In front of each fixed wing are located a plurality of propellers that produce the airstream that allows the fixed wings to produce the desired lifting effect and to direct the airstream to the superposed wings for further control. In operation, the superposed wings are lowered to produce a direct lifting force. For forward propulsion, the wings are raised to afford the desired speed.

DISCLOSURE OF THE INVENTION

The improved vertical/short takeoff or landing (V/STOL) aircraft is designed to provide a simplified V/STOL configuration having improved controllability in all three axis during a vertical takeoff, landing and hovering flight operation. The above improvements are accomplished without requiring auxiliary engines and propellers or jets to achieve either pitch or lateral control.

The improved V/STOL includes a rotatable primary wing and a fixed forward or canard wing as it is generally called, that is attached to the forward section of the fuselage. The canard wing supports at least two engines with their associated pusher propellers that rotate counter to each other. The canard wing includes a set of trailing edge flaps that may be interconnected with the elevators attached to the horizontal stabilizer. These flaps provide additional lift and a high degree of longitudinal stability to overcome the inherent nose down pitching moment produced by the primary wing and its attached flaps. The pitching moment occurs when the flaps are deployed through a large angle which is required to gain the maximum lift coefficient of the primary wing. Utilizing the canard flaps as elevons (combined ailerons and elevators), the canard wing additionally provides a degree of lateral control due to the velocity of the air inflowing to the pusher propellers.

One of the major features of the improved V/STOL aircraft is the ability to rotate the primary wing. This wing is located in the wake of the high velocity air flow provided by the propellers, allowing the wing to achieve its maximum lift capability when rotated. The aircraft utilizes the high velocity air (slipstream) emitted from the pusher propellers flowing over and under the primary wing. This occurrence more than doubles the lift force available over that portion of the primary wing covering an area in width nearly equal to the diameter of the propellers at zero forward airspeed of the entire aircraft.

Additionally, the aircraft utilizes the inflow of air into the propeller disk, which sweeps over and under the canard wing. This condition provides additional lift and control forces to allow for changing the pitch attitude of the entire aircraft.

Primary lateral (roll) control during vertical ascent, descent and hovering flight is achieved by spoilers attached near the aft portion of the upper surfaces of the primary wing. The spoilers are located in the high velocity air flow emitted by the propellers and operate independently of each other to act in the manner of conventional ailerons to maintain a high degree of lateral control. The spoilers can also operate in conjunction with the elevons attached to the canard wing and both are operated simultaneously by one control input from the pilot or remote radio control in the case of a remotely piloted vehicle Additionally, spoilers may similarly be attached to the canard wing if greater lateral control is required as in the case of a very large aircraft configuration.

The improved V/STOL aircraft additionally utilizes a conventional type of horizontal stabilizer with attached elevators. The elevators work in conjunction with the canard flaps to control the pitch attitude of the aircraft through a single control input controlled by a pilot or radio.

The aircraft additionally utilizes two or more conventional type vertical stabilizers with suitably attached rudders, to control the yaw attitude of the aircraft. Both the horizontal and vertical stabilizers are located within the wake (slipstream) of high velocity air emitted by the propellers. This allows for both pitch and yaw control of the aircraft at zero forward speed such as during vertical ascent, descent or hovering flight.

Under adverse loading and/or high altitude air density conditions, the improved V/STOL aircraft has the ability to be utilized as a short takeoff and landing aircraft by partial rotation of the primary wing coincident with independent deployment of the flaps.

This design is not limited to mounting two or more engines on the canard wing. Two or more appropriate engines may be located within the interior of the fuselage and connected by means of suitable shafting to right-angle-drive gear boxes, which are mounted on or within the canard wing, to deliver power to the pusher propellers. The engines, whether mounted on the canard wing or within the fuselage, are interconnected by suitable shafting and operate through one-way (slip) clutches. This arrangement provides that one or more engines may continue to operate all of the propellers in the event of failure to either of the engines during the critical vertical takeoff, landing or hovering mode of operation.

In the case where the aircraft is used as a conventional type of aircraft as during horizontal flight, all control surfaces act in a manner similar to the control surfaces of conventional aircraft, controlling the three axis of movement: yaw, pitch and roll.

BEST MODE FOR CARRYING OUT THE INVENTION

Figure 1:
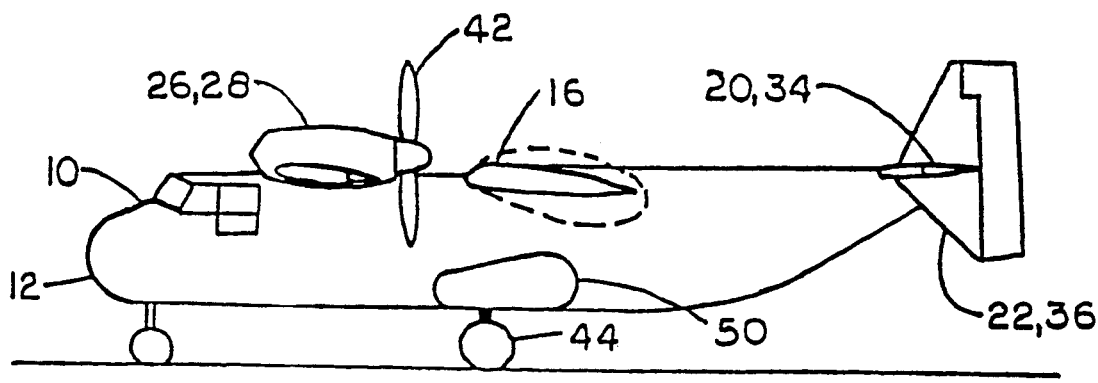
FIG. 1 is a side elevational view of the improved V/STOL aircraft showing the primary wing in conventional flying position and the relationship of various component parts.

The best mode for carrying out the improved vertical/short takeoff or landing (V/STOL) aircraft 10 is presented in terms of a preferred embodiment that is designed to produce a locally generated controlled airstream that is directed upon a primary wing. The wing embodies the shape of an airfoil which has a controlled angle of incidence in relation to the airstream. Thus, providing sufficient lift to allow the aircraft to takeoff and land vertically or to hover in flight.

The preferred embodiment of the aircraft 10, as shown in FIGS. 1-4, is comprised of the following major elements: a fuselage 12, a canard wing 14, a primary wing 16, a primary wing leading edge device 18, a horizontal stabilizer 20, a vertical stabilizer 22, a primary wing trailing edge flap 24, an engine 26, an engine nacelle 28, a primary wing fence 30, a canard wing elevon 32, an elevator 34, a rudder 36, a variable-angle air-inlet vane 38, an engine transverse shaft 40, a pusher propeller 42, a set of landing gear 44, a primary aileron 46, a primary wing spoiler 48, a landing gear pod 50 and a right-angle drive gear box 52.

Figure 2:
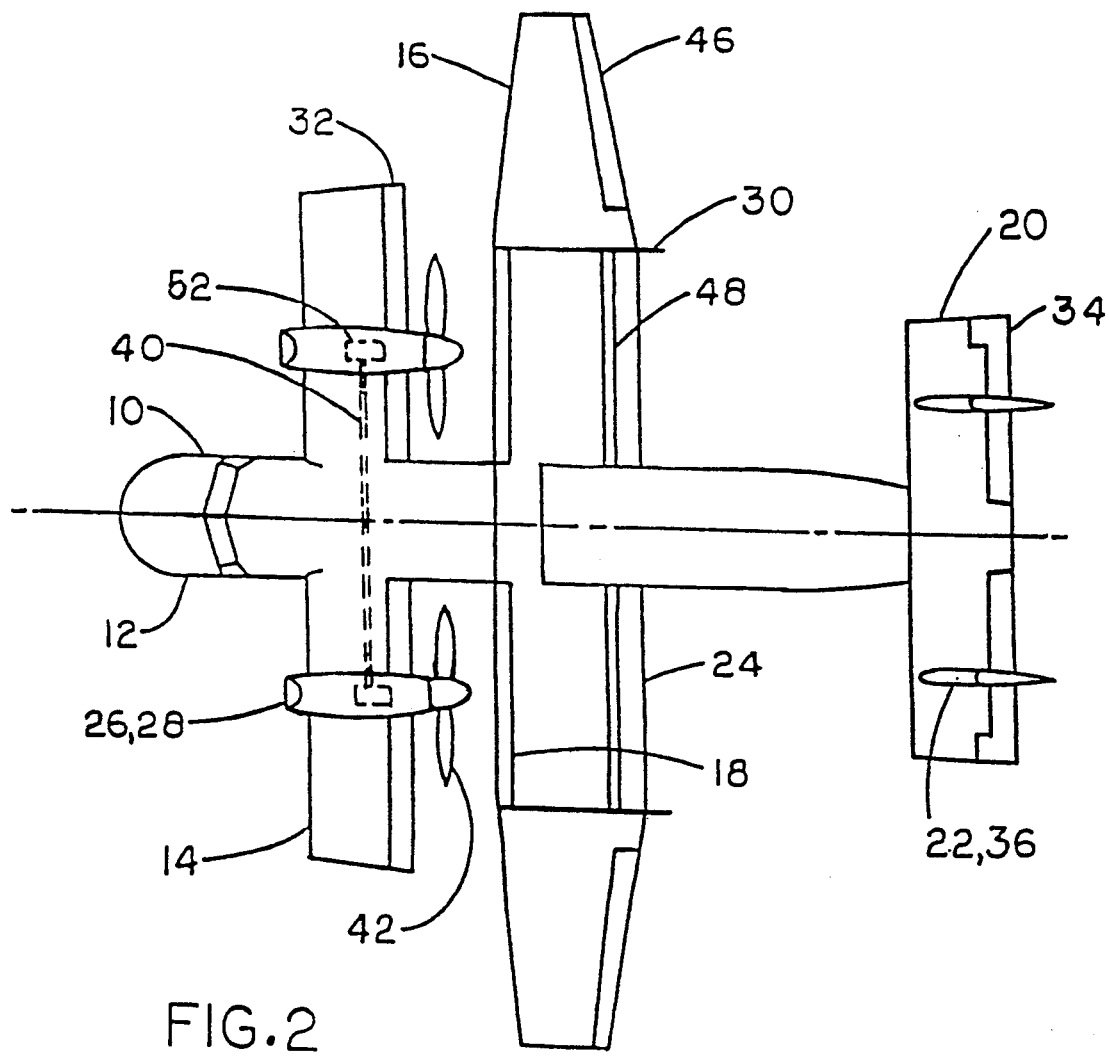
FIG. 2 is a top view showing the fuselage, canard wing, primary wing and horizontal stabilizer in relation to one another.
Figure 3:
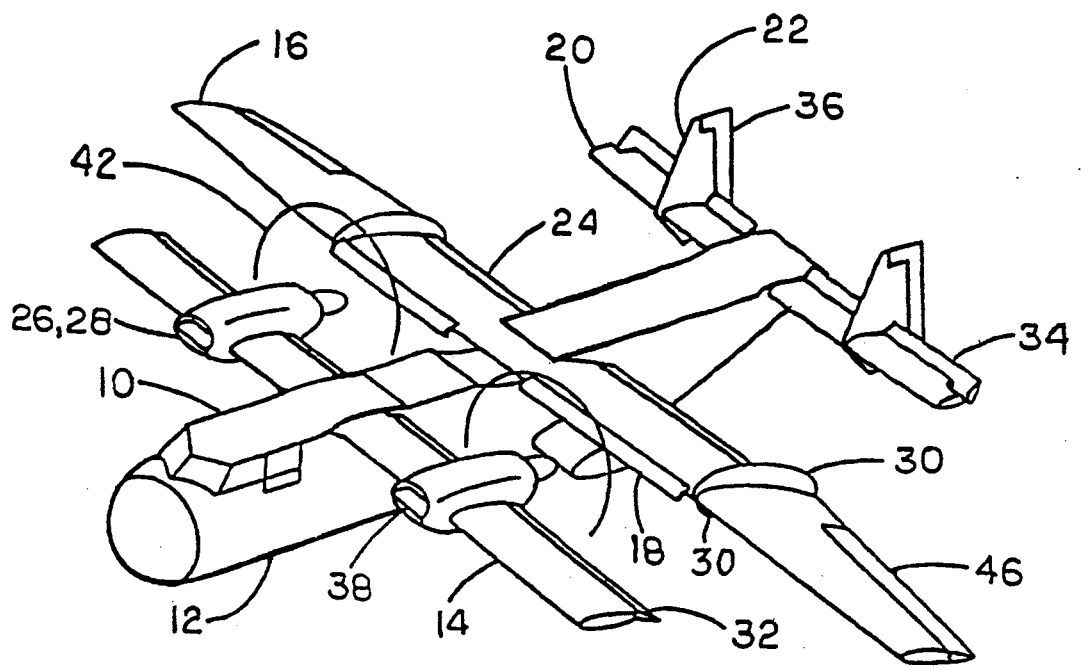
FIG. 3 is a perspective view of an aircraft showing the primary wing rotated for vertical ascent or descent operation.

The canard wing 14, as best shown in FIGS. 2 and 3, is fixedly attached to the forward section of the fuselage 12. To each side of the canard wing is attached an engine 26 that may consists of a turbo-shaft engine or a reciprocating piston type engine. Each of the engines drives a pusher propeller 42 with a suitable number of blades and that has a fixed or controllable pitch. The canard wing airfoil and the axis of the propellers maintain an attitude that is substantially parallel to the longitudinal axis of the fuselage 12.

Figure 5:
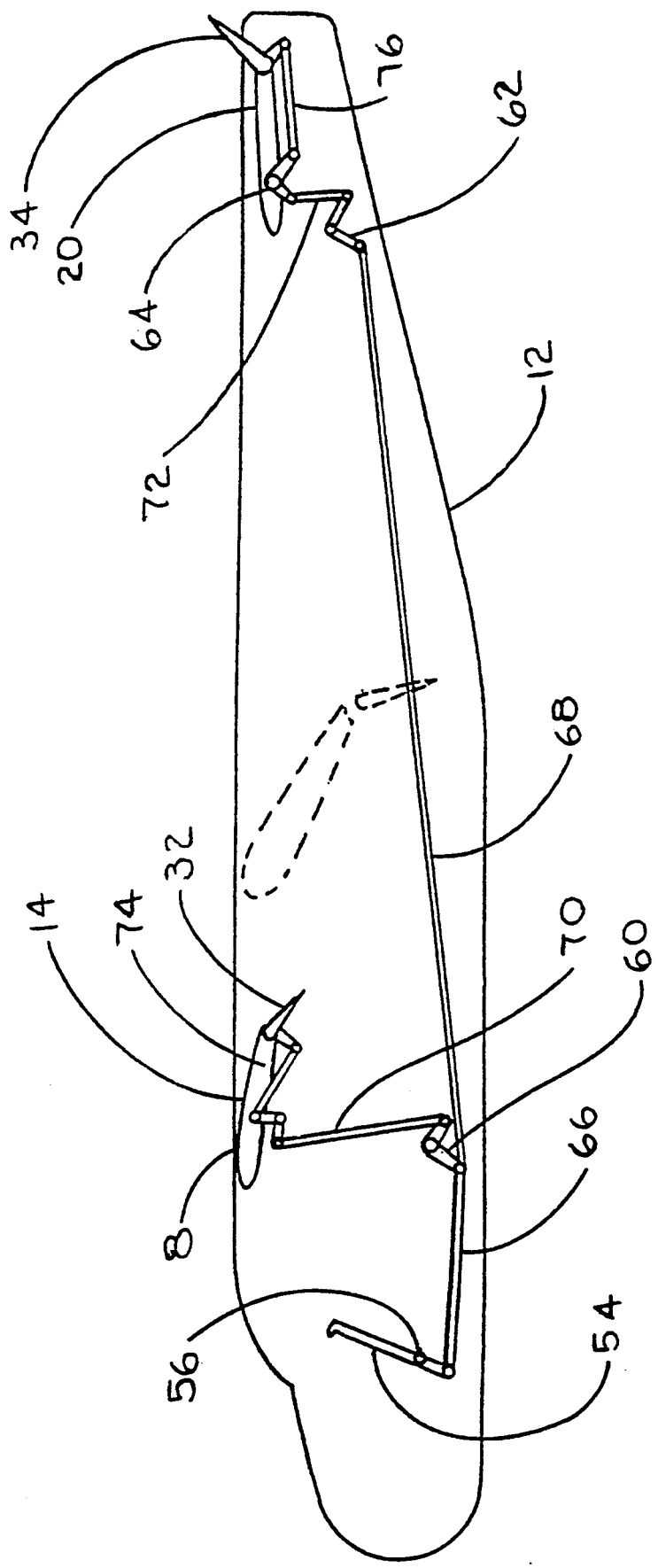
FIG. 5 is an inboard elevational view showing the interconnection of the canard flaps working in combination with the elevators attached to the horizontal stabilizer for pitch attitude control.

The canard wing includes a set of flaps 32 that provide lift and longitudinal stability and that may be used as elevons. In one configuration, as shown in FIG. 5, the flaps 32 are interconnected with the elevators 34 that are rotatably attached to the horizontal stabilizer 20. This interconnection consists of a control stick 54 which rotates about a pivot point 56 that operates a forward push-pull control rod 66 which is connected to a bell crank 60. From this point forces are distributed to a midsection push-pull control rod 68 and an intermediate control rod 70. The rod 70 is connected to a bell crank 58 which is connected to flap control link 74. The midsection push-pull control rod 68 is connected to a bell crank 62 which, in turn, is connected to intermediate control rod 72 which is connected to bell crank 64 which is connected to the elevator control link 76. This interconnection provides additional lift and longitudinal stability to overcome the inherent nose down pitching moment produced by the primary wing 16 and its associated flaps 24.

Figure 4:
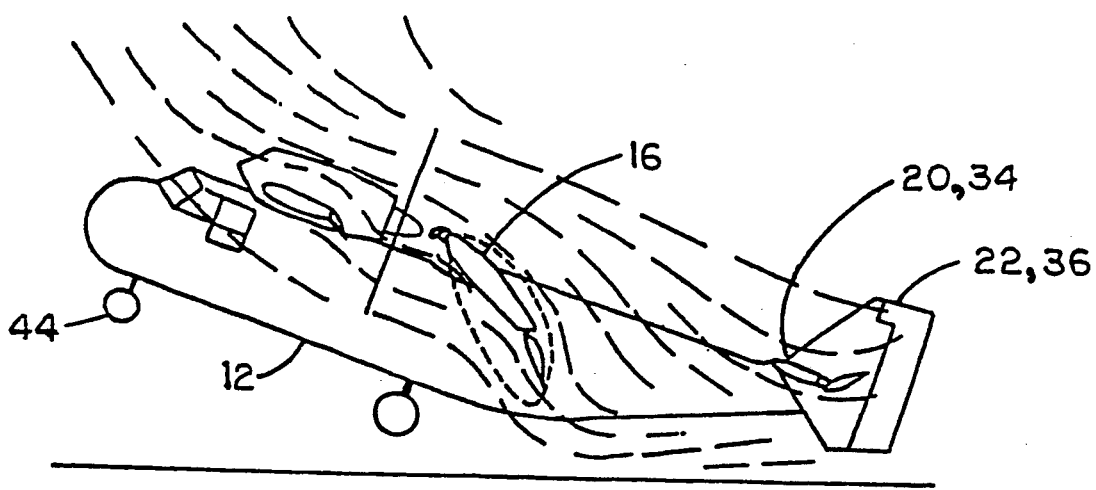
FIG. 4 is a schematic illustration of air flow resulting from the pusher propellers during vertical takeoff operation.

The primary wing 16 as also best shown in FIGS. 2 and 3, provides lift, has a larger cross-section than that of the canard wing 14, and is rotatably attached to the upper section of the fuselage aft of the canard wing 14. The principle novelty of the wing 16 is its ability to rotate downwardly about its chordwise axis as shown in FIG. 4. The rotation may be accomplished in a number of ways; one utilizes a rotating screw mechanism that controls the downward movement of the wing in relation to the fuselage. When the wing is rotated, it achieves its maximum coefficient of lift to thus allow the aircraft to takeoff vertically.

The primary wing 16 is designed with a number of control surfaces: a spoiler 48 is attached to the upper rearward surface of the wing 16 in the path of the eflux from the pusher propellers 42. The wing also incorporates a pair of ailerons 46 that control the rolling of the aircraft on its longitudinal axis. The spoilers 48 and ailerons 46 may be designed to function in combination with the canard wing flaps 32 to enhance the lateral control during vertical takeoff or landing and conventional flight.

The primary wing also includes a pair of trailing edge flaps 24 that increase the wings lift coefficient. The flaps are movable downwardly and angularly relative to and spaced from the rear of said primary wing. Thus, forming a slot between the flaps 24 and the wing 16 as best shown in FIG. 4. The flap is also interconnected to the wing so that the flap can be deployed angularly independently of when the wing is rotated. In one design configuration, the conard flaps may be interconnected to the elevators of the vertical stabilizer to provide additional pitch control during a vertical takeoff or landing and conventional flight.

Attached to the primary wing 16 behind the propellers in the path of the propeller slipstream, is a leading edge device 18 such as a Kreuger type flap or a slat and slot combination. The device 18 provides the wing with a high increment of lift.

The final wing control surface discussed is a wing fence 30 that is attached to each side of the primary wing 16 as best shown in FIG. 3. The fences confine the high velocity slipstream emitted by the propellers 42 to each portion of the primary wing which lies in the path of the propeller slipstream.

At the rear of the fuselage 12 is attached a tail control group consisting of a horizontal stabilizer 20 that stabilizes the pitching motion of the aircraft. The stabilizer is attached to the fuselage 12 with adjustable positive and negative angles of incidence and has rotatably attached to its rear surface the elevators 34. To the fuselage or stabilizer is attached a least one vertical stabilizer 22 having a rotatably attached rudder 36. The vertical stabilizer and rudder control the direction of flight by impressing yawing moments on the aircraft. As shown best in FIG. 3, the preferred tail control group consists of a split stabilizer and elevators having on each side a vertical stabilizer and rudder.

Figure 6:
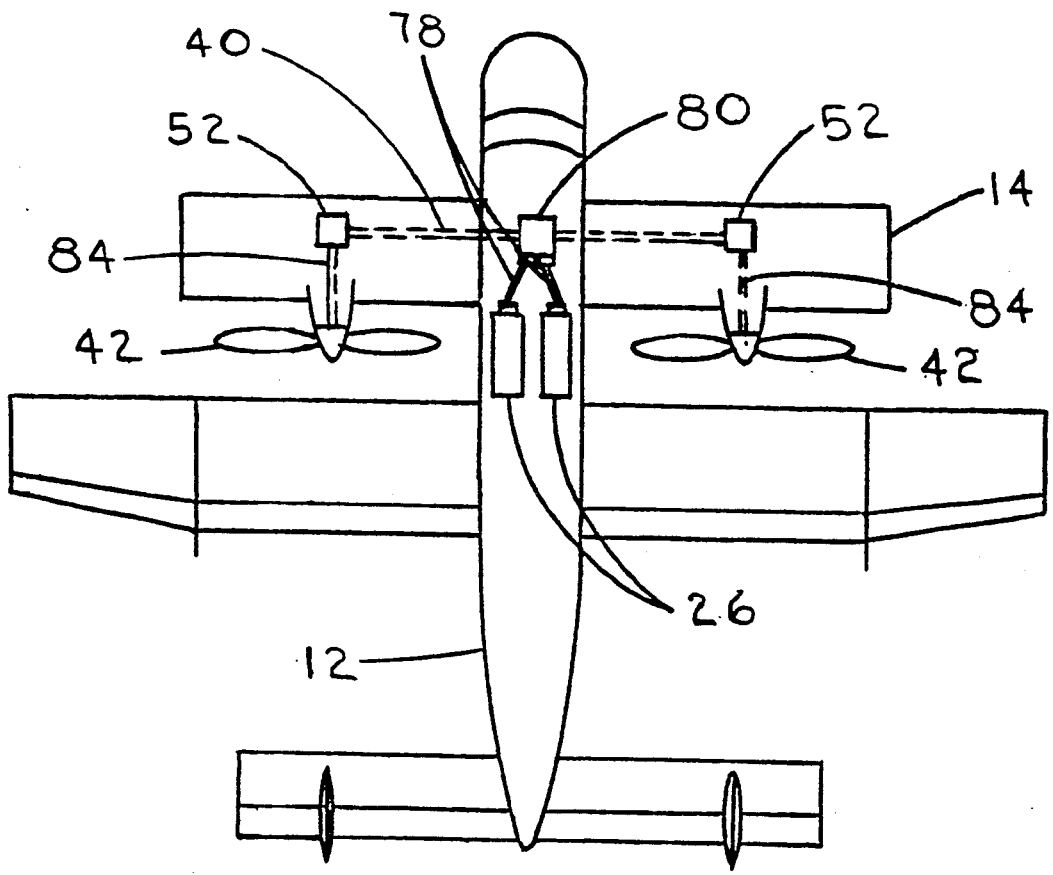
FIG. 6 is a plan view showing the arrangement of the two engines side-by-side, each with an independent shaft carrying power to the gearbox which drives a transverse shaft.
Figure 7:
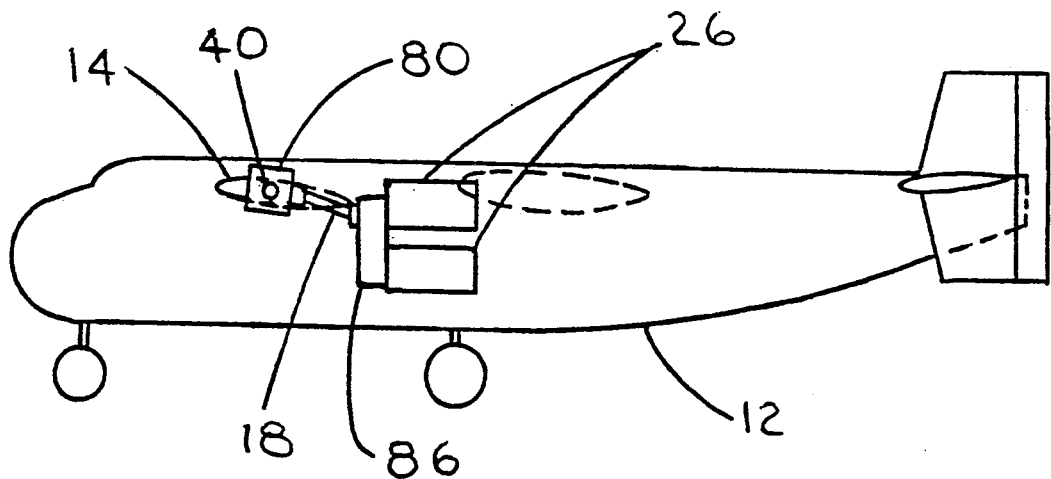
FIG. 7 is an inboard elevational view showing the arrangement of the two engines mounted one above the other, interconnected by a gearbox, which is connected by a shaft to a gearbox which drives the transverse shaft.

The engines 26 as previously stated are preferably mounted, as shown in FIGS. 2 and 3, to the canard wing 14 within an engine nacelle 28. However, the engines may also be mounted inside the fuselage, as shown in FIGS. 6 and 7, and connected by means of a shaft 78 to the right-angle drive gear box 80 which transmits power to the transverse shaft 40 which, in turn, connects to two right-angle gear boxes 52 that contain the propeller shafts 84. As also shown in FIG. 7, the two engines 26 may be mounted vertically and connected together by means of a gear box 86. The engine nacelle 28 may also have as shown in FIG. 3, a variable-angle air-inlet vane 38. The vane automatically directs and controls the air flow into the engine nacelle 28 during a vertical takeoff climb to prevent the air flow from stalling at the nacelle opening. The vane 38 tilts in the opposite direction to also direct and control air flow during a vertical landing.

As a further design consideration, the engines may be interconnected by an engine transverse shaft 40. Thus, a single engine will provide sufficient power to the propellers to sustain a vertical takeoff or landing and conventional flight.

The landing gear set is preferably housed in a pair of pods 50 that are attached to the fuselage as shown in FIG. 1. The landing gear retracts into the pods during flight to enhance streamline flight.

OPERATION

The improved V/STOL aircraft 10 flies conventionally and has vertical takeoff or landing capabilities. These capabilities are accomplished by the unique arrangement of the primary wing 16 and the canard wing 14 with its attached engines 26 and pusher propellers 42.

The primary wing is rotated to achieve its maximum coefficient of lift prior to takeoff or landing. Additionally, the primary wing is equipped with a leading edge device 18, and trailing edge flaps 24, the combination of which increase the lift capability by two times that of the basic airfoil. Lateral stability, at zero forward flight speed, is obtained by the primary wing spoilers 48 which are located in the eflux emitted by the pusher propellers 42. During conventional flight operations, the primary wing 16 is rotated to a position approximately paralleling the longitudinal axis of the aircraft and operates in the manner of conventional aircraft wherein lateral control is obtained by the ailerons 46, with or without the aid of the spoilers 48.

In the preferred embodiment, two engines 36, located within their nacelles 28, and with their associated propellers 42, are mounted on each side of the canard wing 14 as close as practicable to the fuselage 12. The engines are mounted close to the fuselage to minimize the lateral moment arms derived from the lifting forces of the wing 16 and canard 14 and from the yaw moment arms derived from the thrust provided by the propellers 42.

The horizontal and vertical tail surfaces 20, 34 and 22, 36 are positioned in the slipstream of the pusher propellers 42 so that at zero forward speed of the aircraft, the elevators 34 provide pitch control and the rudders 36 provide yaw control. The tail surfaces are located on as long a moment arm as is practicable to maximize the stability and controllability.

The horizontal stabilizer 20, as shown in FIG. 3, is preferably adjustably mounted atop the rear portion of the fuselage 12. The stabilizer provides controlled movement relative thereto for varying its attitude thereby changing the trim condition of the aircraft.

Additionally, the inflow of air to the propellers create lift on the canard wing 14 when the elevons 32 are deflected downward to function as flaps. The canard flaps also act to augment the pitch control of the aircraft over and above that obtained from the horizontal stabilizer.

While the invention has been described in complete detail and pictorially shown in the accompanying drawings it is not to be limited to such details, since many changes and modifications may be made to the invention without departing from the spirit and the scope thereof. For example, the canard wing 14 may be eliminated and airfoil shaped pylons substituted to support the engines outward of the fuselage. This scheme would however, lose the additional lift gained by the canard wing and would still require a small canard wing, acting as a forward elevator to augment pitch control over and above that provided by the conventional horizontal stabilizer and elevator combination, hence, it is described to cover any and all modifications and forms which may come within the language and scope of the claims.

I claim:

1. An improved vertical/short takeoff or landing aircraft comprising:

a) a fuselage, b) a canard wing fixedly attached to the forward upper section of said fuselage, c) an engine attached to each side of said canard wing where each of said engines drives a pusher propeller and where the airfoil of said canard wing and the rotational axis of said propellers maintain an attitude substantially parallel to the longitudinal axis of said fuselage, d) a set of flaps rotatably attached to the trailing edge of said canard wing, where said flaps provide lift and longitudinal stability, e) a primary wing rotatably attached to the upper section of said fuselage aft of said canard wing, said primary wing having the means to allow said primary wing to rotate downwardly about its chordwise axis to achieve its maximum coefficient of lift, and where said engines generate a controlled propeller airstream that is directed upon the airfoil of said primary wing causing said wing to create sufficient lift to allow said aircraft to takeoff vertically from a braked or standstill position, f) a leading edge device attached to each side of said primary wing in the path of said propeller airstream where said devices provide said wing with a high increment of lift, g) a pair of flaps attached to the trailing edge of said primary wing when said flaps increase the lift coefficient of said wing, and where said flaps move downwardly and angularly relative to and spaced from the rear of said primary wing thereby forming a slot between said flap and said wing, with said flap interconnected to said wing so that said flap is deployed angularly when said wing is rotated, h) a pair of ailerons attached to the trailing edge of said primary wing where said ailerons control the rolling of said aircraft on its longitudinal axis, i) a wing fence attached to the upper and lower surfaces of said primary wing, where said fences confine the high velocity slipstream emitted by said propellers, j) a spoiler attached to the upper, rearward surface of said primary wing in the eflux from said propellers, where said spoilers provide lateral control at zero forward flight speed, k) a horizontal stabilizer and elevator that stabilizes the pitching motion of said aircraft, l) a vertical stabilizer and rudder that controls the direction of flight by impressing yawing moments on said aircraft, said horizontal stabilizer and elevator; and said vertical stabilizer and rudder being located at the tail of said aircraft, and m) a landing gear set (44).

2. The aircraft as specified in claim 1 wherein said canard wing flaps are interconnected with the elevators attached to said horizontal stabilizer to provide additional lift and longitudinal stability to overcome the inherent nose down pitching moment produced by said primary wing and its associated flaps.

3. The aircraft as specified in claim 1 wherein said means to rotate said primary wing is accomplished by a rotating screw mechanism.

4. The aircraft as specified in claim 1 wherein said primary wing spoilers and ailerons function in combination with aid canard wing flaps to provide lateral control during vertical takeoff or landing and conventional flight.

5. The aircraft as specified in claim 1 wherein said leading edge device comprises a seat and slot combination.

6. The aircraft as specified in claim 1 wherein said engines are located within an engine nacelle having at its inlet opening a variable-angle air-inlet that automatically directs and controls the air flow into said engine nacelle during a vertical takeoff climb and tilts in the opposite direction to also direct and control air flow during a vertical landing.

* * * * *